US008976448B1

(12) United States Patent
Kitagawa et al.

(10) Patent No.: US 8,976,448 B1
(45) Date of Patent: Mar. 10, 2015

(54) METHOD OF PRODUCING OPTICAL FILM LAMINATE

(71) Applicant: Nitto Denko Corporation, Ibaraki-shi, Osaka (JP)

(72) Inventors: Takeharu Kitagawa, Ibaraki (JP); Muniridin Yasen, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 14/106,971

(22) Filed: Dec. 16, 2013

(30) Foreign Application Priority Data

Sep. 11, 2013 (JP) ................... 2013-188049

(51) Int. Cl.
*G02B 5/30* (2006.01)
*B32B 37/14* (2006.01)

(52) U.S. Cl.
CPC .............. *G02B 5/3025* (2013.01); *B32B 37/14* (2013.01); *Y10S 359/90* (2013.01)
USPC ....... 359/483.01; 359/900; 156/229; 156/247

(58) Field of Classification Search
USPC ............. 359/483.01, 485.01, 487.01, 489.01, 359/599, 601, 900; 156/229, 247
See application file for complete search history.

(56) References Cited

U.S. PATENT DOCUMENTS

| 5,930,040 | A | * | 7/1999 | Janovec et al. | ................ | 359/530 |
| 6,570,707 | B1 | * | 5/2003 | Murakami et al. | ....... | 359/489.07 |
| 8,314,987 | B2 | | 11/2012 | Goto et al. | | |
| 8,320,042 | B2 | | 11/2012 | Goto et al. | | |
| 8,379,169 | B2 | | 2/2013 | Kitagawa et al. | | |
| 8,411,360 | B2 | | 4/2013 | Kitagawa et al. | | |
| 8,520,169 | B2 | | 8/2013 | Kitagawa et al. | | |
| 8,520,171 | B2 | | 8/2013 | Kitagawa et al. | | |
| 8,609,005 | B2 | * | 12/2013 | Takeyama et al. | ............ | 264/291 |
| 8,709,567 | B2 | | 4/2014 | Kitagawa et al. | | |
| 8,721,816 | B2 | | 5/2014 | Kitagawa et al. | | |
| 8,771,454 | B2 | | 7/2014 | Goto et al. | | |

(Continued)

FOREIGN PATENT DOCUMENTS

| CN | 102331635 A | 1/2012 |
| CN | 103185910 A | 7/2013 |

(Continued)

OTHER PUBLICATIONS

Chinese Office Action dated Sep. 24, 2014, issued in corresponding Chinese Patent Application No. 201410095579.4, w/English translation (9 pages).

*Primary Examiner* — Frank Font
(74) *Attorney, Agent, or Firm* — Westerman, Hattori, Daniels & Adrian, LLP

(57) ABSTRACT

A method of producing an optical film laminate includes: stretching and dyeing a laminate including a resin substrate and a polyvinyl alcohol-based resin layer formed on one side of the resin substrate to produce a polarizing film on the resin substrate; laminating a first protective film on the polarizing film on an opposite side to the resin substrate; and peeling the resin substrate, followed by laminating a second protective film on the polarizing film on a side from which the resin substrate has been peeled. The first protective film is a protective film to be placed on an optical cell side when the optical film laminate is attached to the optical cell, the second protective film is a protective film to be placed on an opposite side to the optical cell when the optical film laminate is attached to the optical cell.

8 Claims, 5 Drawing Sheets

(56) References Cited

U.S. PATENT DOCUMENTS

| | | |
|---|---|---|
| 8,852,374 B2 | 10/2014 | Goto et al. |
| 2007/0231506 A1* | 10/2007 | Ohgaru et al. ............... 428/1.31 |
| 2011/0242141 A1* | 10/2011 | Yamakita et al. ............. 345/690 |
| 2012/0022191 A1* | 1/2012 | Toita et al. ................... 524/115 |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2013/0100529 A1 | 4/2013 | Kitagawa et al. |
| 2013/0114139 A1 | 5/2013 | Kitagawa et al. |
| 2013/0169912 A1* | 7/2013 | Ooishi et al. .................... 349/96 |
| 2013/0170033 A1 | 7/2013 | Park et al. |
| 2013/0295349 A1* | 11/2013 | Yamasaki et al. ............. 428/203 |
| 2014/0186568 A1 | 7/2014 | Kitagawa et al. |

FOREIGN PATENT DOCUMENTS

| | | |
|---|---|---|
| JP | 11-179871 A | 7/1999 |
| JP | 2000-338329 A | 12/2000 |
| JP | 2002-174729 A | 6/2002 |
| JP | 2007-240640 A | 9/2007 |
| JP | 2011-138070 A | 7/2011 |
| JP | 5146628 B1 | 3/2013 |
| WO | 2012/161123 A1 | 11/2012 |

* cited by examiner

METHOD OF PRODUCING OPTICAL FILM LAMINATE

This application claims priority under 35 U.S.C. Section 119 to Japanese Patent Application No. 2013-188049 filed on Sep. 11, 2013, which is herein incorporated by reference.

BACKGROUND OF THE INVENTION

1. Field of the Invention

The present invention relates to a method of producing an optical film laminate.

2. Description of the Related Art

A polarizing plate is placed on each of both sides of a liquid crystal cell of a liquid crystal display apparatus, which is a typical image display apparatus, the placement being attributable to an image-forming mode of the apparatus. The following method has been known as a method of producing the polarizing plate (for example, Japanese Patent Application Laid-open No. Hei 11-179871). A protective film is placed on each of both sides of a polarizer, and then the protective films are attached to both sides of the polarizer by continuously passing the polarizer and the protective films through a pair of rolls while supplying an adhesive to a gap between the polarizer and each of the protective films.

By the way, in recent years, in association with a demand for thinning of the image display apparatus, there has been required a technology with which an optical film laminate having a thin polarizing film much thinner than such polarizer as described above can be industrially produced. For example, the following method has been proposed as a method of producing such optical film laminate (for example, Japanese Patent Application Laid-open No. 2000-338329). A laminate having a resin substrate and a polyvinyl alcohol (PVA)-based resin layer is stretched, and then a polarizing element layer is produced by subjecting the laminate to a dyeing treatment. After that, a protective film is attached to the polarizing element layer side of the laminate, the resin substrate is peeled, and another protective film is attached to the surface from which the resin substrate has been peeled. In such production method, the protective films need to be sequentially attached. Accordingly, in some cases, undesired curling occurs in an optical film laminate to be obtained and inconveniences (such as air bubbles and wrinkles) occur when the optical film laminate is attached to an optical cell such as a liquid crystal cell later. In particular, the problem tends to be additionally remarkable when one of the protective films also serves as an optical compensation film or an antireflection retardation film (typically a λ/4 plate) for thinning the optical film laminate.

SUMMARY OF THE INVENTION

According to an embodiment of the present invention, there is provided a method of producing an optical film laminate including stretching and dyeing a laminate having a resin substrate and a PVA-based resin layer to form a thin polarizing film on the resin substrate, with which the occurrence of undesired curling can be prevented, and as a result, the occurrence of inconveniences such as air bubbles and wrinkles can be prevented upon attachment of the optical film laminate to an optical cell.

A method of producing an optical film laminate according to an embodiment of the present invention includes: stretching and dyeing a laminate including a resin substrate and a polyvinyl alcohol-based resin layer formed on one side of the resin substrate to produce a polarizing film on the resin substrate; laminating a first protective film on the polarizing film on an opposite side to the resin substrate; and peeling the resin substrate, followed by laminating a second protective film on the polarizing film on a side from which the resin substrate has been peeled. The first protective film is a protective film to be placed on an optical cell side when the optical film laminate is attached to the optical cell, the second protective film is a protective film to be placed on an opposite side to the optical cell when the optical film laminate is attached to the optical cell. The first protective film has a linear expansion coefficient larger than a linear expansion coefficient of the second protective film in at least one of a feed direction of the optical film laminate and a direction perpendicular to the feed direction.

In one embodiment of the present invention, a laminate of the first protective film and the polarizing film is convex toward the first protective film side when the resin substrate has been peeled.

In one embodiment of the present invention, each of the linear expansion coefficients of the first protective film and the second protective film in the feed direction and the direction perpendicular to the feed direction is 10 ($10^{-6}$/K) or more and 100 ($10^{-6}$/K) or less.

In one embodiment of the present invention, the first protective film has an optical compensation function.

In one embodiment of the present invention, the lamination of at least one of the first protective film and the second protective film is performed under heating.

According to another aspect of the present invention, an optical film laminate is provided. The optical film laminate is obtained by the production method as described above.

DETAILED DESCRIPTION OF THE PREFERRED EMBODIMENTS

Preferred embodiments of the present invention are described below. However, the present invention is not limited to these embodiments.

The simple expression "curling" is used herein in the context that such curling phenomenon is preferred or in a context where the phenomenon called curling is generally described. The phrase "curling phenomenon is preferred" means the case where the degree of the curling is appropriate and the attachment of an optical film laminate to an optical cell is easy. On the other hand, the expression such as "undesired curling" or "curling is terrible" is used herein in the context that such curling phenomenon is not preferred. More specifically, such expression means the case where the curling is so terrible that the attachment of the optical film laminate to the optical cell is difficult or impossible. A person skilled in the art, when reading the description at the relevant part, clearly understands the context in which the term "curling" is used.

The present invention relates to a method of producing an optical film laminate including stretching and dyeing a laminate having a resin substrate and a PVA-based resin layer formed on one side of the resin substrate to produce a thin polarizing film on the resin substrate. In the present invention, after a protective film to be placed on an optical cell side (hereinafter sometimes referred to as "first protective film") has been laminated on the polarizing film surface of a laminate of the resin substrate and the polarizing film, the resin substrate is peeled, and after the resin substrate has been peeled, a protective film to be placed on an opposite side to an optical cell (hereinafter sometimes referred to as "second protective film") is laminated on the peeled surface. When the first protective film and the second protective film are laminated in the stated order, the occurrence of undesired curling can be prevented in an optical film laminate to be obtained. As a result, the occurrence of inconveniences such as air bubbles and wrinkles can be prevented upon attachment of the optical film laminate to be obtained to the optical cell. Hereinafter, an example of the method of producing an optical film laminate of the present invention is specifically described.

a. Production of Polarizing Film

A-1. Laminate

Figure 1A:
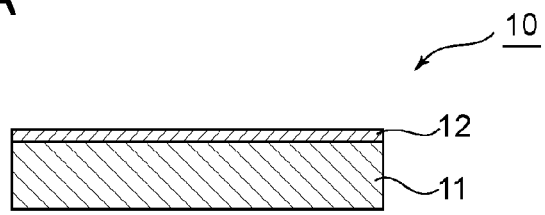
FIGS. 1A to 1D are schematic views each illustrating an example of a method of producing an optical film laminate of the present invention.

FIGS. 1A to 1D are schematic views each illustrating an example of a method of producing an optical film laminate of the present invention. As shown in FIG. 1A, a laminate 10 has a resin substrate 11 and a PVA-based resin layer 12. The laminate 10 is typically produced by forming the PVA-based resin layer 12 on the resin substrate 11 having a long shape. Any appropriate method may be adopted as a method of forming the PVA-based resin layer 12. The PVA-based resin layer 12 is preferably formed by applying an application liquid containing a PVA-based resin onto the resin substrate 11 and drying the liquid.

As a formation material for the resin substrate, any appropriate thermoplastic resin may be adopted. Examples of the thermoplastic resin include: an ester-based resin such as a polyethylene terephthalate-based resin; a cycloolefin-based resin such as a norbornene-based resin; an olefin-based resin such as polypropylene; a polyamide-based resin; a polycarbonate-based resin; and a copolymer resin thereof. Of those, a norbornene-based resin and an amorphous polyethylene terephthalate-based resin are preferred.

In one embodiment, an amorphous (uncrystallized) polyethylene terephthalate-based resin is preferably used. In particular, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid component and a copolymer further containing cyclohexane dimethanol as a glycol component.

When an underwater stretching mode is adopted in a stretching treatment to be described later, the resin substrate can absorb water and the water acts as like a plasticizer so that the substrate can plasticize. As a result, a stretching stress can be significantly reduced. Accordingly, the stretching can be performed at a high ratio and the stretchability of the resin substrate can be more excellent than that at the time of in-air stretching. As a result, a polarizing film having excellent optical characteristics can be produced. In one embodiment, the percentage of water absorption of the resin substrate is preferably 0.2% or more, more preferably 0.30 or more. Meanwhile, the percentage of water absorption of the resin substrate is preferably 3.0% or less, more preferably 1.0% or less. The use of such resin substrate can prevent, for example, the following inconvenience: the dimensional stability of the resin substrate remarkably reduces at the time of the production and hence the external appearance of the polarizing film to be obtained deteriorates. In addition, the use of such resin substrate can prevent the rupture of the substrate at the time of the underwater stretching and the peeling of the PVA-based resin layer from the resin substrate. It should be noted that the percentage of water absorption of the resin substrate can be adjusted by, for example, introducing a modification group into the constituent material. The percentage of water absorption is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, the glass transition temperature is more preferably 120° C. or less in consideration of the plasticization of the resin substrate by water and favorable performance of the underwater stretching. In one embodiment, the glass transition temperature of the resin substrate is preferably 60° C. or more. The use of such resin substrate prevents an inconvenience such as the deformation of the resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.). In another embodiment, a glass transition temperature of less than 60° C. is permitted as long as the resin substrate does not deform during the application and drying of the application liquid containing the PVA-based resin. It should be noted that the glass transition temperature of the resin substrate can be adjusted by, for example, introducing a modification group into the formation material or heating the substrate constituted of a crystallization material. The glass transition temperature (Tg) is a value determined in conformity with JIS K 7121.

The thickness of the resin substrate before the stretching is preferably 20 μm to 300 μm, more preferably 50 μm to 200 μm. When the thickness is less than 20 μm, it may be difficult to form the PVA-based resin layer. When the thickness exceeds 300 μm, in, for example, underwater stretching, it may take a long time for the resin substrate to absorb water, and an excessively large load may be needed in the stretching.

Any appropriate resin may be adopted as the PVA-based resin for forming the PVA-based resin layer. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin may be appropriately selected depending on purposes. The average polymerization degree is typically 1,000 to 10,000, preferably 1,200 to 5,000, more preferably 1,500 to 4,500. It should be noted that the average polymerization degree can be determined in conformity with JIS K 6726-1994.

The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained. In addition, examples of the additive include an easy-adhesion component. The use of the easy-adhesion component can improve adhesiveness between the resin substrate and the PVA-based resin layer. As a result, an inconvenience such as peeling of the PVA-based resin layer from the substrate is suppressed, and dyeing and underwater stretching to be described later can be satisfactorily performed. Examples of the easy-adhesion component include a modified PVA such as acetoacetyl modified PVA.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The thickness of the PVA-based resin layer before the stretching is preferably 3 μm to 40 μm, more preferably 3 μm to 20 μm.

The resin substrate may be subjected to a surface treatment (such as a corona treatment) before the formation of the PVA-based resin layer. Alternatively, an easy-adhesion layer may be formed on the resin substrate. Such treatment can improve adhesiveness between the resin substrate and the PVA-based resin layer.

A-2. Stretching of Laminate

Any appropriate method may be adopted as a method of stretching the laminate. Specifically, fixed-end stretching may be adopted or free-end stretching (such as a method involving passing the laminate through rolls having different peripheral speeds to uniaxially stretch the laminate) may be adopted. Of those, free-end stretching is preferred.

The stretching direction of the laminate may be appropriately set. In one embodiment, the laminate having a long shape is stretched in its lengthwise direction. In this case, there may be typically adopted a method involving passing the laminate between rolls having different peripheral speeds to stretch the laminate. In another embodiment, the laminate having a long shape is stretched in its widthwise direction. In this case, there may be typically adopted a method involving stretching the laminate using a tenter stretching apparatus.

A stretching mode is not particularly limited and may be an in-air stretching mode or an underwater stretching mode. Of those, an underwater stretching mode is preferred. According to the underwater stretching mode, the stretching can be performed at a temperature lower than the glass transition temperature (typically about 80° C.) of each of the resin substrate and the PVA-based resin layer, and hence the PVA-based resin layer can be stretched at a high ratio while its crystallization is suppressed. As a result, a polarizing film having excellent optical characteristics can be produced.

The stretching of the laminate may be performed in one stage, or may be performed in a plurality of stages. When the stretching is performed in a plurality of stages, for example, the free-end stretching and the fix-end stretching may be performed in combination, or the underwater stretching mode and the in-air stretching mode may be performed in combination. When the stretching is performed in a plurality of stages, the stretching ratio (maximum stretching ratio) of the laminate to be described later is the product of stretching ratios in the respective stages.

The stretching temperature of the laminate may be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the resin substrate is preferably 60° C. or more in relation to the formation of the PVA-based resin layer. In this case, when the stretching temperature falls short of 40° C., there is a possibility that the stretching cannot be satisfactorily performed even in consideration of the plasticization of the resin substrate by water. On the other hand, as the temperature of the stretching bath increases, the solubility of the PVA-based resin layer is raised and hence excellent optical characteristics may not be obtained. The laminate is preferably immersed in the stretching bath for a time of 15 seconds to 5 minutes.

When the underwater stretching mode is adopted, the laminate is preferably stretched while being immersed in an aqueous solution of boric acid (in-boric-acid-solution stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent may also be used.

When a dichromatic substance (typically iodine) has been caused to dissolve and permeate in the PVA-based resin layer in advance by dyeing to be described later, the stretching bath (aqueous solution of boric acid) is preferably compounded with an iodide. Compounding the bath with the iodide can suppress the elution of iodine that the PVA-based resin layer has been caused to adsorb. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The concentration of the iodide is preferably 0.05 part by weight to 15 parts by weight, more preferably 0.5 part by weight to 8 parts by weight with respect to 100 parts by weight of water.

The stretching ratio (maximum stretching ratio) of the laminate is preferably 5.0 times or more with respect to the original length of the laminate. Such high stretching ratio can be achieved by adopting, for example, the underwater stretching mode (in-boric-acid-solution stretching). It should be noted that the term "maximum stretching ratio" as used in this specification refers to a stretching ratio immediately before the rupture of the laminate. The stretching ratio at which the laminate ruptures is separately identified and a value lower than the value by 0.2 is the maximum stretching ratio.

In one embodiment, the laminate is subjected to in-air stretching at high temperature (e.g., 95° C. or more), and then subjected to the in-boric-acid-solution stretching, and dyeing to be described later. Such in-air stretching is hereinafter referred to as "preliminary in-air stretching" because the stretching can be ranked as stretching preliminary or auxiliary to the in-boric-acid-solution stretching.

When the preliminary in-air stretching is combined with the in-boric-acid-solution stretching, the laminate can be stretched at an additionally high ratio in some cases. As a result, a polarizing film having additionally excellent optical characteristics (such as a polarization degree) can be produced. For example, when a polyethylene terephthalate-based resin is used as the resin substrate, the resin substrate can be stretched satisfactorily, while its orientation is suppressed, by a combination of the preliminary in-air stretching and the in-boric-acid-solution stretching than that in the case of the in-boric-acid-solution stretching alone. As the orientation property of the resin substrate is raised, its stretching tension increases and hence it becomes difficult to stably stretch the substrate or the resin substrate ruptures. Accordingly, the laminate can be stretched at an additionally high ratio by stretching the resin substrate while suppressing its orientation.

In addition, when the preliminary in-air stretching is combined with the in-boric-acid-solution stretching, the orientation property of the PVA-based resin is improved and hence the orientation property of the PVA-based resin can be improved even after the in-boric-acid-solution stretching. Specifically, the orientation property of the PVA-based resin is improved in advance by the preliminary in-air stretching so that the PVA-based resin may easily cross-link with boric acid during the in-boric-acid-solution stretching. Then, the stretching is performed in a state where boric acid serves as a junction, and hence the orientation property of the PVA-based resin is assumed to be high even after the in-boric-acid-solution stretching. As a result, a polarizing film having excellent optical characteristics (such as a polarization degree) can be produced.

The stretching ratio in the preliminary in-air stretching is preferably 3.5 times or less. A stretching temperature in the preliminary in-air stretching is preferably equal to or higher than the glass transition temperature of the PVA-based resin. The stretching temperature is preferably 95° C. to 150° C. It should be noted that the maximum stretching ratio when the preliminary in-air stretching and the in-boric-acid-solution stretching are combined with each other is preferably 5.0 times or more, more preferably 5.5 times or more, still more preferably 6.0 times or more with respect to the original length of the laminate.

A-3. Dyeing

The dyeing of the laminate is typically performed by causing a dichromatic substance (preferably iodine) to dissolve and permeate in the PVA-based resin layer. A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, a method involving immersing the laminate in the dyeing liquid is preferred. This is because iodine can satisfactorily dissolve and permeate in the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide so that the solubility of iodine in water may be increased. Specific examples of the iodide are as described above. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. so that the dissolution of the PVA-based resin may be suppressed. When the PVA-based resin layer is immersed in the dyeing liquid, an immersion time is preferably 5 seconds to 5 minutes so that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

The dyeing treatment can be performed at any appropriate timing. When the underwater stretching is performed, the dyeing treatment is preferably performed before the underwater stretching.

A-4. Any Other Treatment

The laminate may be appropriately subjected to a treatment for forming the PVA-based resin layer into a polarizing film in addition to the stretching and dyeing. Examples of the treatment for forming the PVA-based resin layer into the polarizing film include an insolubilizing treatment, a cross-linking treatment, a washing treatment, and a drying treatment. It should be noted that the number of times, order, and the like of these treatments are not particularly limited.

The insolubilizing treatment is typically performed by immersing the PVA-based resin layer in an aqueous solution of boric acid. Water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed before the underwater stretching treatment or the dyeing treatment.

The cross-linking treatment is typically performed by immersing the PVA-based resin layer in an aqueous solution of boric acid. Water resistance can be imparted to the PVA-based resin layer by subjecting the layer to the cross-linking treatment. The concentration of the aqueous solution of boric acid is preferably 1 part by weight to 5 parts by weight with respect to 100 parts by weight of water. In addition, when the cross-linking treatment is performed after the dyeing treatment, the solution is preferably further compounded with an iodide. Compounding the solution with the iodide can suppress the elution of iodine which has been caused to dissolve and permeate in the PVA-based resin layer. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 60° C. The cross-linking treatment is preferably performed before the underwater stretching treatment. In a preferred embodiment, the dyeing treatment, the cross-linking treatment, and the underwater stretching treatment are performed in the stated order.

The washing treatment is typically performed by immersing the PVA-based resin layer in an aqueous solution of potassium iodide. The drying temperature in the drying treatment is preferably 30° C. to 100° C.

A-5. Polarizing Film

The polarizing film is substantially a PVA-based resin film obtained by aligning the dichromatic substance that has dissolved and permeated in the PVA-based resin. The thickness of the polarizing film is typically 25 µm or less, preferably 15 µm or less, more preferably 10 µm or less, still more preferably 7 µm or less, particularly preferably 5 µm or less. Meanwhile, the thickness of the polarizing film is preferably 0.5 µm or more, more preferably 1.5 µm or more. The polarizing film preferably shows absorption dichroism at any wavelength in the wavelength range of 380 nm to 780 nm. The polarizing film has a single axis transmittance of preferably 40.0% or more, more preferably 41.0% or more, still more preferably 42.0% or more, particularly preferably 43.0% or more. The polarizing film has a polarization degree of preferably 99.8% or more, more preferably 99.9% or more, still more preferably 99.95% or more.

B. Lamination of First Protective Film

B-1. Outline of Lamination

Figure 1B:
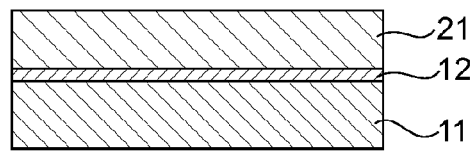

After the laminate (the PVA-based resin layer) has been subjected to the respective treatments, a first protective film 21 is laminated on the laminate on the polarizing film (PVA-based resin layer) 12 side as illustrated in FIG. 1B. Typically, the first protective film of a long shape is laminated on the long laminate so that their lengthwise directions may be aligned with each other. In one embodiment, the first protective film is attached to the surface of the polarizing film by applying an adhesive to the surface of the first protective film.

In one embodiment, the lamination (attachment) of the first protective film is performed under heating. When the adhesive to be described later is an aqueous adhesive or a solvent-based adhesive, the heating temperature is the temperature at which the adhesive dries, and when the adhesive is an active energy ray-curable adhesive, the temperature is the temperature at which the adhesive cures. The heating temperature is preferably 50° C. or more, more preferably 55° C. or more, still more preferably 60° C. or more. Meanwhile, the heating temperature is preferably 80° C. or less. It should be noted that the heating to be performed upon lamination of the first protective film may also serve as a drying treatment for the laminate.

B-2. First Protective Film

The first protective film is a protective film to be placed on the optical cell side when the optical film laminate to be obtained is attached to the optical cell. When the protective film to be placed on the optical cell side is attached in advance, the occurrence of undesired curling can be prevented in the optical film laminate to be obtained. As a result, an optical film laminate capable of preventing the occurrence of inconveniences such as air bubbles and wrinkles upon its attachment to the optical cell can be obtained.

The first protective film may be an ordinary protective film or may have an optical compensation function (may be a retardation film). The first protective film preferably has an optical compensation function. With such construction, the first protective film can also serve as an optical compensation film and hence additional thinning of the optical film laminate can be realized. Further, when the first protective film has an optical compensation function, laminating the first protective film in advance makes the effect of the present invention, i.e., the prevention of undesired curling, additionally significant. When the first protective film has an optical compensation function, its optical compensation characteristics (such as a refractive index ellipsoid, an in-plane retardation, and a thickness direction retardation) can be appropriately set depending on purposes.

In one embodiment, the linear expansion coefficient of the first protective film is larger than the linear expansion coefficient of a second protective film to be described later in at least one of the feed direction of the optical film laminate and a direction perpendicular to the feed direction. In general, in a three-layer laminate including films having different linear expansion coefficients on both sides, such curling that the laminate is convex toward a side of the film having the smaller linear expansion coefficient is expected to occur. However, the inventors of the present invention have found that when films are sequentially laminated, upon lamination of a subsequent film, such a force that a side of the film to be laminated later is concave is generated and curling caused by such force becomes dominant. Further, the inventors have found that when films having different characteristics are sequentially laminated on both sides of a polarizing film, the direction and degree of the curling caused by such force as described above can be controlled by specifying the order in which the films are laminated. As a result, in the present invention, unlike the general expectation, such curling that the optical film laminate to be obtained is convex toward the first protective film side, which has a relatively large linear expansion coefficient, can be caused in the laminate. The utilization of such effect of the present invention enables the use of such film having an optical compensation function (having a large linear expansion coefficient and causing undesired curling in many cases) as described above as the first protective film. Each of the linear expansion coefficients of the first protective film in the feed direction and the direction perpendicular to the feed direction is, for example, 10 ($10^{-6}$/K) or more and 100 ($10^{-6}$/K) or less. It should be noted that linear expansion coefficient is determined in conformity with JIS K 7197.

Any appropriate resin film that may be placed on the optical cell side upon attachment of the optical film laminate to the optical cell may be adopted as the first protective film. A material for forming the protective film is exemplified by: a cellulose-based resin such as triacetyl cellulose (TAC); a cycloolefin-based resin such as a norbornene-based resin; an olefin-based resin such as polyethylene or polypropylene; a polyester-based resin; and a (meth)acrylic resin. It should be noted that the term "(meth)acrylic resin" means an acrylic resin and/or a methacrylic resin.

The thickness of the first protective film is typically 10 μm to 100 μm, preferably 15 μm to 60 μm. The thickness of the first protective film is typically smaller than the thickness of the second protective film. In general, in a three-layer laminate including films having different thicknesses on both sides, such curling that the laminate is convex toward the film side, which has the larger thickness, is expected to occur. However, according to the present invention, unlike the general expectation in the art, such curling that the laminate is convex toward the first protective film side, which has a relatively small thickness can be caused. The mechanism via which such curling is caused can be assumed to be the same as that described for the linear expansion coefficient.

B-3. Adhesive to be Used in Lamination

Any appropriate adhesive may be adopted as the adhesive to be used in the lamination of the first protective film. Specifically, the adhesive may be an aqueous adhesive, may be a solvent-based adhesive, or may be an active energy ray-curable adhesive.

Any appropriate adhesive may be used as the active energy ray-curable adhesive as long as the adhesive can cure through irradiation with an active energy ray. Examples of the active energy ray-curable adhesive include a UV-curable adhesive and an electron beam-curable adhesive. Specific examples of the curing type of the active energy ray-curable adhesive include a radical-curing type, a cation-curing type, an anion-curing type, and a combination thereof (such as a hybrid of a radical-curing type and a cation-curing type).

The active energy ray-curable adhesive is, for example, an adhesive containing, as a curing component, a compound (e.g., a monomer and/or an oligomer) having a radically polymerizable group such as a (meth)acrylate group or a (meth)acrylamide group.

Specific examples of the active energy ray-curable adhesive and a method of curing the adhesive are disclosed in, for example, Japanese Patent Application Laid-open No. 2012-144690. The disclosure is incorporated herein by reference.

Any appropriate aqueous adhesive may be adopted as the aqueous adhesive. An aqueous adhesive containing a PVA-based resin is preferably used. The average polymerization degree of the PVA-based resin in the aqueous adhesive is preferably about 100 to 5,500, more preferably 1,000 to 4,500 in terms of adhesion. Its average saponification degree is preferably about 85 mol % to 100 mol %, more preferably 90 mol % to 100 mol % in terms of adhesion.

The PVA-based resin in the aqueous adhesive preferably contains an acetoacetyl group. This is because such resin can be excellent in adhesiveness between the PVA-based resin layer and the protective film, and in durability. The acetoacetyl group-containing PVA-based resin is obtained by, for example, causing a PVA-based resin and diketene to react with each other by any appropriate method. The acetoacetyl group modification degree of the acetoacetyl group-containing PVA-based resin is typically 0.1 mol % or more, preferably about 0.1 mol % to 40 mol %, more preferably 1 mol % to 20 mol %, particularly preferably 1 mol % to 7 mol %. It should be noted that the acetoacetyl group modification degree is a value measured by NMR.

The resin concentration of the aqueous adhesive is preferably 0.1 wt % to 15 wt %, more preferably 0.5 wt % to 10 wt %.

The thickness of the adhesive at the time of its application can be set to any appropriate value. For example, the thickness is set so that an adhesive layer having a desired thickness may be obtained after curing or after heating (drying). The thickness of the adhesive layer is preferably 0.01 μm to 7 μm, more preferably 0.01 μm to 5 μm, still more preferably 0.01 μm to 2 μm, most preferably 0.01 μm to 1 μm. When the thickness of the adhesive layer is excessively small, the cohesive strength of the adhesive itself is not obtained and hence an adhesive strength is not obtained in some cases. When the thickness of the adhesive layer is excessively large, the optical film laminate may be unable to satisfy durability.

C. Peeling of Resin Substrate

Figure 1C:
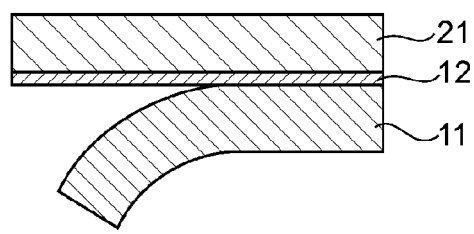

Next, as illustrated in FIG. 1C, the resin substrate 11 is peeled from a laminate of the resin substrate 11, the polarizing film 12, and the first protective film 21. Any appropriate method may be adopted as a method for the peeling. For example, the resin substrate 11 may be peeled by being pulled downward as illustrated in FIG. 1C, or the resin substrate 11 may be peeled by pulling a laminate of the polarizing film 12 and the first protective film 21 upward.

In one embodiment, the laminate of the polarizing film 12 and the first protective film 21 is convex toward the first protective film 21 side upon peeling of the resin substrate 11. The first protective film is placed on the optical cell side and hence the attachment of the optical film laminate to be obtained to the optical cell is facilitated by such construction.

D. Lamination of Second Protective Film

Figure 1D:
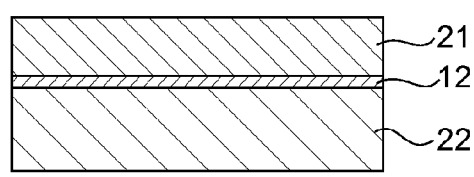

After the resin substrate has been peeled, a second protective film 22 is laminated on the side of the laminate from which the resin substrate has been peeled as illustrated in FIG. 1D. Thus, an optical film laminate 100 is obtained. Typically, the second protective film of a long shape is laminated on the long laminate so that their lengthwise directions may be aligned with each other. In one embodiment, the second protective film is attached to the peeled side of the laminate (substantially the surface of the polarizing film) by applying an adhesive to the second protective film. Conditions (such as a heating temperature) for the lamination of the second protective film and the adhesive to be used are as described for the lamination of the first protective film.

The second protective film is a protective film to be placed on the opposite side to the optical cell upon attachment of the optical film laminate to be obtained to the optical cell and is preferably a protective film to be placed on a viewer side. The attachment of the protective film to be placed on the opposite side to the optical cell to the surface from which the resin substrate has been peeled can provide an optical film laminate that can be easily attached to the optical cell.

The second protective film may be subjected to any appropriate surface treatment depending on purposes. Specific examples of the surface treatment include a hard coat treatment, an antireflection treatment, an anti-sticking treatment, a diffusion treatment, and an antiglare treatment.

In one embodiment, the linear expansion coefficient of the second protective film is smaller than the linear expansion coefficient of the first protective film in at least one of the feed direction of the optical film laminate and the direction perpendicular to the feed direction. As described above, according to common general technical knowledge in the art, such curling that the optical film laminate to be obtained is convex toward a side of the second protective film having a relatively small linear expansion coefficient is expected to occur. In the present invention, however, such curling that the laminate is convex toward the first protective film side, which has a relatively large linear expansion coefficient can be caused by specifying the order in which the first protective film and the second protective film are laminated. It should be noted that each of the linear expansion coefficients of the second protective film in the feed direction and the direction perpendicular to the feed direction is, for example, 10 ($10^{-6}$/K) or more and 100 ($10^{-6}$/K) or less.

Any appropriate resin film that may be placed on the opposite side to the optical cell upon attachment of the optical film laminate to the optical cell may be adopted as the second protective film. A material for forming the protective film is exemplified by: a cyloolefin-based resin such as a norbornene-based resin; an olefin-based resin such as a polyethylene or a polypropylene; a polyester-based resin; and a (meth)acrylic resin. It should be noted that the term "(meth) acrylic resin" means an acrylic resin and/or a methacrylic resin.

The thickness of the second protective film is typically 20 μm to 100 μm, preferably 10 μm to 60 μm. The thickness of the second protective film is typically larger than the thickness of the first protective film.

In one embodiment, the optical film laminate 100 is convex toward the first protective film 21 side. The first protective film is placed on the optical cell side and hence the attachment of the optical film laminate to the optical cell is facilitated by such construction.

The optical film laminate can be produced as described above. Such optical film laminate can be easily attached to an optical cell, and can prevent the occurrence of inconveniences such as air bubbles and wrinkles upon its attachment to the optical cell. As a result, the use of such optical film laminate can provide an image display apparatus excellent in external appearance. Typical examples of the optical cell for which the optical film laminate may be used include a liquid crystal cell and an organic electroluminescence (EL) cell. Therefore, typical examples of the image display apparatus include a liquid crystal display apparatus and an organic EL display apparatus.

EXAMPLES

Hereinafter, the present invention is specifically described by way of examples. However, the present invention is not limited by Examples shown below.

Example 1

An amorphous polyethylene terephthalate (A-PET) film (manufactured by Mitsubishi Chemical Corporation, trade name "NOVACLEAR SH046," thickness: 200 μm) was used as a resin substrate. The surface of the resin substrate was subjected to a corona treatment (58 W/m²/min).

Meanwhile, a PVA (polymerization degree: 4,200, saponification degree: 99.2%) to which 1 wt % of an acetoacetyl-modified PVA (manufactured by The Nippon Synthetic Chemical Industry Co., Ltd., trade name "GOHSEFIMER Z200," polymerization degree: 1,200, saponification degree: 99.0% or more, acetoacetyl modification degree: 4.6%) had been added was prepared and applied to the corona-treated surface of the resin substrate so that its thickness after drying became 12 μm, followed by drying with hot air in an atmosphere at 60° C. for 10 minutes. Thus, a laminate in which a PVA-based resin layer was formed on the resin substrate was produced.

The resultant laminate was subjected to free-end uniaxial stretching in its longitudinal direction (lengthwise direction) at a ratio of 2.0 times between rolls having different peripheral speeds in an oven at 130° C. (preliminary in-air stretching).

Next, the laminate was immersed in an insolubilizing bath having a liquid temperature of 30° C. (an aqueous solution of boric acid obtained by compounding 100 parts by weight of water with 3 parts by weight of boric acid) for 30 seconds (insolubilizing treatment).

Next, iodine was caused to dissolve and permeate in the PVA-based resin layer by immersing the laminate in a dyeing bath having a liquid temperature of 30° C. (using water as a solvent, containing iodine at a concentration of 0.08 wt % to 0.25 wt %, containing potassium iodide at a concentration of 0.56 wt % to 1.75 wt %, and having a concentration ratio between iodine and potassium iodide of 1:7) (dyeing treatment). It should be noted that the immersion time and the iodine concentration of the dyeing bath were adjusted so that the single axis transmittance of a polarizing film to be obtained (substantially the PVA-based resin layer) became 42.0%.

Next, the laminate was immersed in a cross-linking bath having a liquid temperature of 30° C. (an aqueous solution of boric acid obtained by compounding 100 parts by weight of water with 3 parts by weight of potassium iodide and 4 parts by weight of boric acid) for 60 seconds (cross-linking treatment).

After that, the laminate was subjected to uniaxial stretching in its longitudinal direction (lengthwise direction) between rolls having different peripheral speeds while being immersed in an aqueous solution of boric acid having a liquid temperature of 70° C. (an aqueous solution obtained by compounding 100 parts by weight of water with 4 parts by weight of boric acid and 5 parts by weight of potassium iodide) (underwater stretching). The stretching ratio of the underwater stretching was 2.0 times and hence the final stretching ratio was 5.4 times. Thus, a polarizing film was produced on the resin substrate.

After that, the laminate was immersed in a washing bath having a liquid temperature of 30° C. (an aqueous solution obtained by compounding 100 parts by weight of water with 3.5 parts by weight of potassium iodide) (washing treatment). Further, the laminate was dried with warm air at 60° C. (drying treatment).

Subsequently, a first protective film (cycloolefin-based film, thickness: 25 μm, linear expansion coefficient in a feed direction: $95 \times 10^{-6}$/K, linear expansion coefficient in a direction perpendicular to the feed direction: $68 \times 10^{-6}$/K) was attached to the polarizing film surface of the laminate of the polarizing film and the resin substrate through a PVA-based adhesive by a roll-to-roll process to produce a laminate of the resin substrate, the polarizing film, and the first protective film. Further, the resin substrate was peeled from the laminate and then a second protective film (acrylic film, thickness: 40 μm, linear expansion coefficient in the feed direction: $48 \times 10^{-6}$/K, linear expansion coefficient in the direction perpendicular to the feed direction: $47 \times 10^{-6}$/K) was attached to the peeled surface through a UV-curable adhesive.

Thus, a long optical film laminate having a polarizing film having a thickness of 5 μm was produced.

Figure 2:
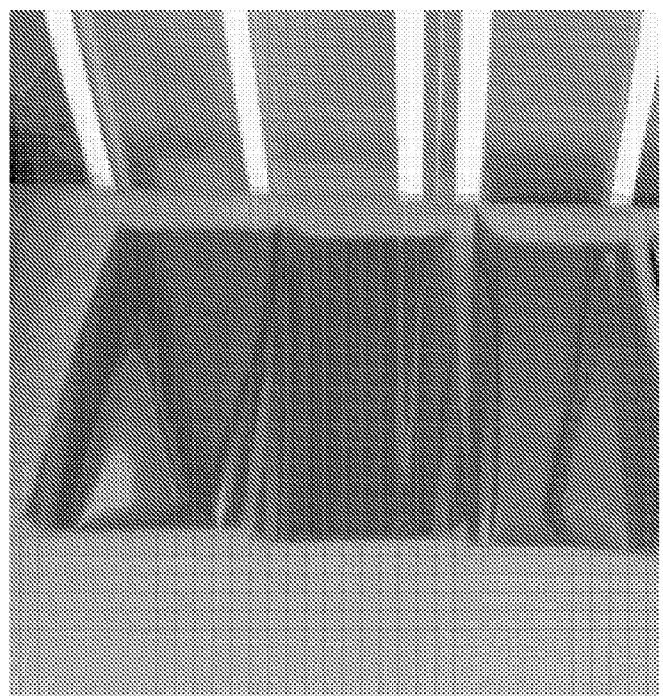
FIG. 2 is a photograph showing the state of the curling of an optical film laminate obtained in Example 1.

The resultant optical film laminate was cut into a sheet having a predetermined size and the state of the curling of the sheet was visually observed. FIG. 2 shows the state of the curling. The optical film laminate was attached to a liquid crystal cell while the first protective film was placed on the liquid crystal cell side. As a result, the laminate was able to be satisfactorily attached to the liquid crystal cell without the occurrence of inconveniences such as air bubbles and wrinkles.

Example 2

Figure 3:
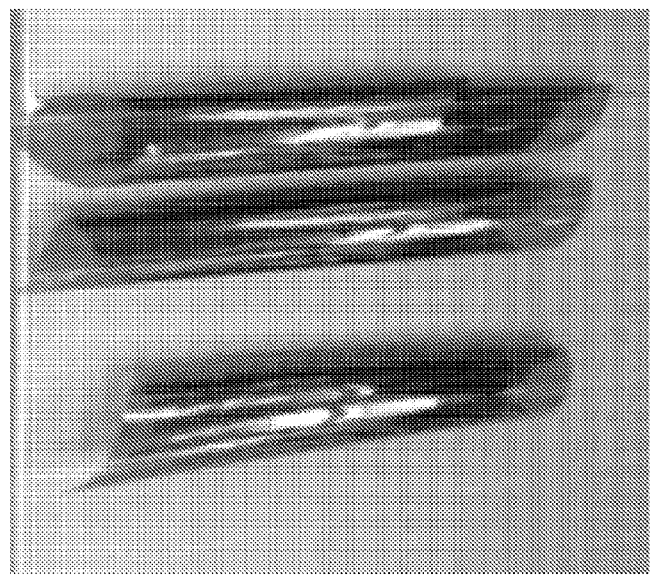
FIG. 3 is a photograph showing the state of the curling of an optical film laminate obtained in Example 2.

An optical film laminate was produced in the same manner as in Example 1 except that the thickness of the first protective film (cycloolefin-based film) was changed to 18 µm, its linear expansion coefficient in the feed direction was changed to $80\times10^{-6}$/K, and its linear expansion coefficient in the direction perpendicular to the feed direction was changed to $36\times10^{-6}$/K. The state of the curling of the resultant optical film laminate was visually observed in the same manner as in Example 1. FIG. 3 shows the state of the curling. The optical film laminate was convex toward the first protective film side, though some degree of curling occurred in the laminate. As a result, when the optical film laminate was attached to a liquid crystal cell while the first protective film was placed on the liquid crystal cell side, the laminate was able to be satisfactorily attached to the liquid crystal cell without the occurrence of inconveniences such as air bubbles and wrinkles.

Comparative Example 1

Figure 4:
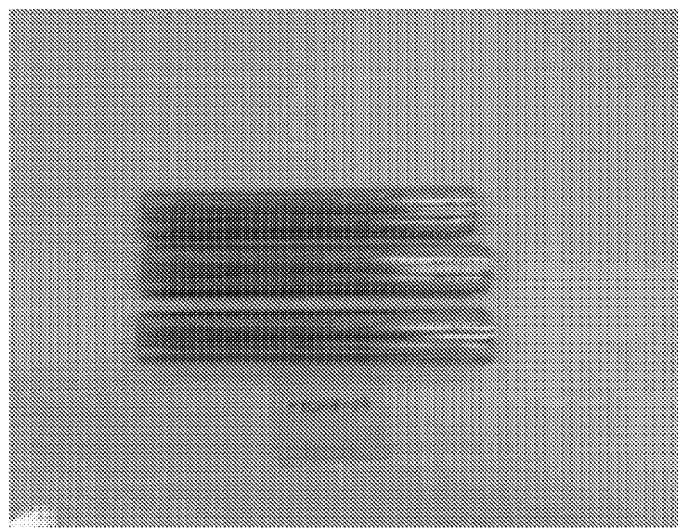
FIG. 4 is a photograph showing the state of the curling of an optical film laminate obtained in Comparative Example 1.

An optical film laminate was produced in the same manner as in Example 1 except the following. The second protective film (acrylic film, thickness: 40 µm, linear expansion coefficient in the feed direction: $48\times10^{-6}$/K, linear expansion coefficient in the direction perpendicular to the feed direction: $47\times10^{-6}$/K) was attached to the polarizing film surface of the laminate of the polarizing film and the resin substrate to produce a laminate of the resin substrate, the polarizing film, and the second protective film. After the resin substrate had been peeled from the laminate, the first protective film (cycloolefin-based film, thickness: 25 µm, linear expansion coefficient in the feed direction: $95\times10^{-6}$/K, linear expansion coefficient in the direction perpendicular to the feed direction: $68\times10^{-6}$/K) was attached. In other words, the order in which the first protective film and the second protective film were attached was inverted. The state of the curling of the resultant optical film laminate was visually observed in the same manner as in Example 1. FIG. 4 shows the state of the curling. It was difficult to attach the optical film laminate to a liquid crystal cell because its curling that was convex toward the second protective film side was terrible and hence the laminate was of a tubular shape.

Comparative Example 2

Figure 5:
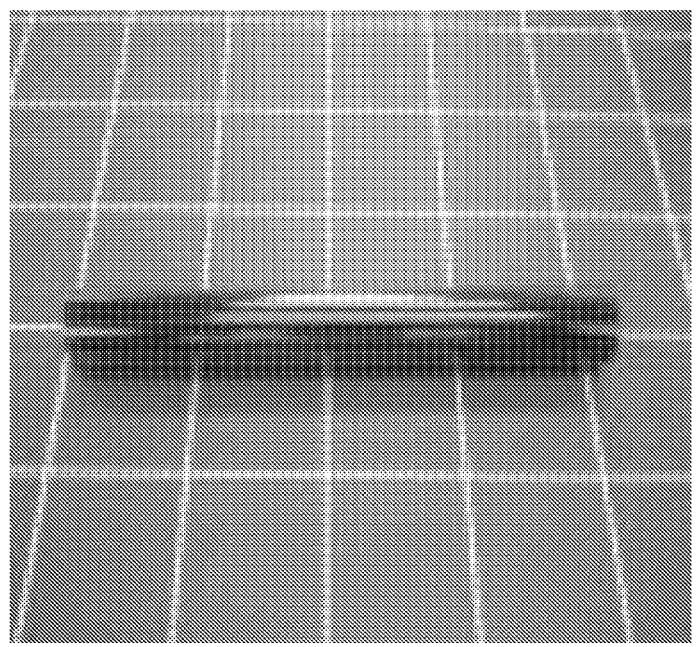
FIG. 5 is a photograph showing the state of the curling of an optical film laminate obtained in Comparative Example 2.

An optical film laminate was produced in the same manner as in Comparative Example 1 except that: a polyethylene terephthalate-based film having a thickness of 50 µm was used as the second protective film; and a cycloolefin-based film having a thickness of 18 µm (linear expansion coefficient in the feed direction: $80\times10^{-6}$/K, linear expansion coefficient in the direction perpendicular to the feed direction: $36\times10^{-6}$/K) was used as the first protective film. The state of the curling of the resultant optical film laminate was visually observed in the same manner as in Example 1. FIG. 5 shows the state of the curling. It was difficult to attach the optical film laminate to a liquid crystal cell because its curling that was convex toward the second protective film side was terrible and hence the laminate was of a tubular shape.

As is apparent from comparison between Example 1 (FIG. 2) and Comparative Example 1 (FIG. 4), the curling is drastically alleviated by attaching the first protective film to be placed on the liquid crystal cell side in advance. Further, as described above, while the optical film laminate of Example 2 curled so as to be convex toward the first protective film side (liquid crystal cell side), the optical film laminate of Comparative Example 2 curled so as to be convex toward the second protective film side (side opposite to the liquid crystal cell). As a result, while the optical film laminate of Example 2 was able to be satisfactorily attached to the liquid crystal cell, it was difficult to attach the optical film laminate of Comparative Example 2 to the liquid crystal cell.

The optical film laminate of the present invention is suitably used for antireflection films for liquid crystal panels and organic EL panels of, for example, liquid crystal televisions, liquid crystal displays, cellular phones, digital cameras, video cameras, portable game machines, car navigation systems, copying machines, printers, facsimile machines, clockes, and microwave ovens.

According to one embodiment of the present invention, in a method of producing an optical film laminate including stretching and dyeing a laminate having a resin substrate and a PVA-based resin layer to form a thin polarizing film on the resin substrate, it is possible to realize the method of producing an optical film laminate in which the occurrence of undesired curling can be prevented by laminating a protective film to be placed on the optical cell side prior to the peeling of the resin substrate, and peeling the resin substrate, followed by the lamination of a protective film to be placed on an opposite side to the optical cell on the peeled surface, and as a result, the occurrence of inconveniences such as air bubbles and wrinkles can be prevented upon attachment of the optical film laminate to the optical cell.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of producing an optical film laminate, comprising:
    stretching and dyeing a laminate comprising a resin substrate and a polyvinyl alcohol-based resin layer formed on one side of the resin substrate to produce a polarizing film on the resin substrate;
    laminating a first protective film on the polarizing film on an opposite side to the resin substrate; and then
    peeling the resin substrate, followed by laminating a second protective film on the polarizing film on a side from which the resin substrate has been peeled,
    wherein the optical film laminate is attached to an optical cell and the first protective film being a protective film is placed on a side of the optical cell, the second protective film being a protective film is placed on an opposite side of the optical cell from the first protective film, and
    wherein the first protective film having a linear expansion coefficient larger than a linear expansion coefficient of the second protective film in at least one of a feed direction of the optical film laminate and a direction perpendicular to the feed direction.

2. The method according to claim 1, wherein a laminate of the first protective film and the polarizing film is convex toward the first protective film side when the resin substrate has been peeled.

3. The method according to claim 1, wherein each of the linear expansion coefficients of the first protective film and the second protective film in the feed direction and the direction perpendicular to the feed direction is 10 ($10^{-6}$/K) to 100 ($10^{-6}$/K) or less.

4. The method according to claim 1, wherein the first protective film has an optical compensation function.

5. The method according to claim 2, wherein the first protective film has an optical compensation function.

6. The method according to claim 3, wherein the first protective film has an optical compensation function.

7. The method according to claim 1, wherein the lamination of at least one of the first protective film and the second protective film is performed under heating.

8. The method according to claim 3, wherein the lamination of at least one of the first protective film and the second protective film is performed under heating.

* * * * *

UNITED STATES PATENT AND TRADEMARK OFFICE
CERTIFICATE OF CORRECTION

Page 1 of 1

PATENT NO. : 8,976,448 B1
APPLICATION NO. : 14/106971
DATED : March 10, 2015
INVENTOR(S) : Takeharu Kitagawa et al.

It is certified that error appears in the above-identified patent and that said Letters Patent is hereby corrected as shown below:

In the Claims

Claim 3, Column 16, Line 61:

Please delete "or less"

Signed and Sealed this
Eleventh Day of August, 2015

Michelle K. Lee
*Director of the United States Patent and Trademark Office*